(12) United States Patent
Larsson et al.

(10) Patent No.: US 9,699,038 B2
(45) Date of Patent: Jul. 4, 2017

(54) NODE AND METHOD FOR SERVICE USAGE REPORTING AND QUOTA ESTABLISHMENT

(71) Applicant: Telefonaktiebolaget L M Ericsson (Publ), Stockholm (SE)

(72) Inventors: Anders P. Larsson, Mölndal (SE); Lars Lövsén, Göteborg (SE); David Shrader, Wilton Manors, FL (US); Jiehong Yang, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/908,022

(22) PCT Filed: Aug. 29, 2013

(86) PCT No.: PCT/EP2013/067912
§ 371 (c)(1),
(2) Date: Jan. 27, 2016

(87) PCT Pub. No.: WO2015/028070
PCT Pub. Date: Mar. 5, 2015

(65) Prior Publication Data
US 2016/0164752 A1 Jun. 9, 2016

(51) Int. Cl.
*H04M 11/00* (2006.01)
*H04L 12/24* (2006.01)
(Continued)

(52) U.S. Cl.
CPC ...... *H04L 41/5029* (2013.01); *H04L 12/1407* (2013.01); *H04L 12/1467* (2013.01);
(Continued)

(58) Field of Classification Search
CPC .... H04W 4/24; H04W 8/245; H04M 1/72519
(Continued)

(56) References Cited

U.S. PATENT DOCUMENTS

2013/0114408 A1* 5/2013 Sastry .................. H04W 28/02 370/231
2014/0040975 A1* 2/2014 Raleigh ................ H04W 12/12 726/1

(Continued)

OTHER PUBLICATIONS

International Search Report and Written Opinion dated Nov. 4, 2013 for International Application Serial No. PCT/EP2013/067912, International Filing Date—Aug. 29, 2013 consisting of 15-pages.
(Continued)

*Primary Examiner* — Danh Le
(74) *Attorney, Agent, or Firm* — Christopher & Weisberg, P.A.

(57) ABSTRACT

Example embodiments presented herein are directed towards a Packet Domain Network Gateway (PGW), and corresponding methods therein, for service usage reporting and quota management in a Policy and Charging Control (PCC) based network. Example embodiments presented herein are also directed towards an Online Charging System (OCS) for receiving service usage reporting and quota management in a PCC based network. Quota reporting and quota management is performed on a pre-rating group basis.

8 Claims, 7 Drawing Sheets

(51) Int. Cl.
  *H04L 12/14* (2006.01)
  *H04M 15/00* (2006.01)
  *H04W 4/24* (2009.01)

(52) U.S. Cl.
  CPC ...... *H04L 41/0893* (2013.01); *H04L 41/5032* (2013.01); *H04M 15/61* (2013.01); *H04M 15/64* (2013.01); *H04M 15/66* (2013.01); *H04M 15/775* (2013.01); *H04M 15/785* (2013.01); *H04M 15/83* (2013.01); *H04M 15/852* (2013.01); *H04W 4/24* (2013.01)

(58) Field of Classification Search
  USPC .............................. 455/408, 405, 418, 550.1
  See application file for complete search history.

(56) References Cited

U.S. PATENT DOCUMENTS

| | | | | |
|---|---|---|---|---|
| 2014/0335791 | A1* | 11/2014 | Kim | H04W 4/008 455/41.2 |
| 2015/0004928 | A1* | 1/2015 | Bejerano | H04M 15/781 455/405 |
| 2015/0038111 | A1* | 2/2015 | Lopez Nieto | H04W 4/24 455/406 |
| 2015/0341851 | A1* | 11/2015 | Cai | H04W 4/08 455/434 |

OTHER PUBLICATIONS

Hakala_et_al_Title: "Diameter Credit-Control Application," Network Working Group, Request for Comments: 4006, Category: Standards Track, Aug. 2005 consisting of 114-pages.

3GPP TS 29.212 V11.8.0 (Mar. 2013) 3rd Generation Partnership Project; Technical Specification Group Core Network and Terminals; Policy and Charging Control (PCC); Reference points (Release 11) Mar. 15, 2013 consisting of 198-pages.

3GPP TS 32299 V11.7.0 (Mar. 2013) 3rd Generation Partnership Project; Technical Specification Group Services and System Aspects; Telecommunication management; Charging management; Diameter charging applications (Release 11) Mar. 15, 2013 consisting of 155-pages.

European First Examination Report dated Apr. 26, 2017 for European Regional Phase Application Serial No. 13 756 46.4-1862, European Regional Phase Entry Date: Feb. 15, 2016 consisting of 11-pages.

* cited by examiner

NODE AND METHOD FOR SERVICE USAGE REPORTING AND QUOTA ESTABLISHMENT

TECHNICAL FIELD

Example embodiments described herein are directed towards a Packet Data Network Gateway (PGW), and corresponding method therein, for reporting service usage with respect to a rating group. Example embodiments are also directed towards an Online Charging System (OCS), and corresponding method therein, for establishing a usage quota for a wireless terminal service usage with respect to a rating group.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

In communication systems, services are typically provided based on predefined packages. Credit control applications provide a framework for real-time charging primarily meant for the communication between gateways/control-points and the back-end account/balance systems.

SUMMARY

Current 3GPP specifications (e.g., 3GPP TS 23.203) recommend or require that credit control sessions be established on a pre-bearer or per Packet Domain Network (PDN) connection. Furthermore, allowable usage quotas are typically provided on a per-service or application basis. Thus, current systems require the use of multiple rating groups to be defined, where an allowable service specific quota is associated with a respective rating group. Therefore, the usage quota management of each service requires separate message signaling.

Furthermore, problems with 'quota-fragmentation' exist. Quota-fragmentation occurs when a same rating group is used by different services. The Online Charging System (OCS) is unable to allocate a common quota to all services mapped to a same rating group. Thus, the OCS instead has to fragment the quota so that it may be shared by different services independently.

Thus, at least one object of the example embodiments is to provide an efficient means of usage reporting and quota establishment or management. The object may be obtained by establishing a single rating group for a plurality or services or Quality of Service Class Identifiers (QCI). At least one example advantage of a single rating group is the decreasing of a signaling load on the Gy/Ro interface between a Policy and Charging Enforcement Function (PCEF)/Packet Domain Network Gateway (PGW) and Online Charging System (OCS) since signaling for quota reporting and/or management may be used for multiple services simultaneously. A further example advantage is the reduction of quota-fragmentation, thereby reducing the complexity of quota establishment performed by the OCS.

According, some of the example embodiments are directed towards a method, in a PGW for reporting service usage with respect to a rating group. The PGW is configured to operate in a communications network. The method comprises sending, to an OCS, a MSCC report. The MSCC report comprises a usage report for at least two services, or at least two QCIs, associated with a single rating group. The method also comprises receiving, from the OCS, an updated quota threshold. The updated quota threshold provides an indication of a maximum allowed usage for any number of services, or QCIs, associated with the single rating group. The method further comprises implementing the updated quota threshold.

Some of the example embodiments are directed towards a PGW for reporting service usage with respect to a rating group. The PGW is configured to operate in a communications network. The PGW comprises digital circuitry configured to send, to an OCS, a MSCC report. The MSCC report comprises a usage report for at least two services, or at least two, QCIs, associated with a single rating group. The digital circuitry is further configured to receive, from the OCS, an updated quota threshold. The updated quota threshold provides an indication of a maximum allowed usage for any number of services, or QCIs, associated with the single rating group. The processing circuitry is further configured to implement the updated quota threshold.

Some example embodiments are directed towards a method in an OCS for establishing a usage quota for wireless terminal service usage with respect to a rating group. The OCS is configured to operate in a communications network. The method comprises receiving, from a PGW, a MSCC report. The MSCC report comprises a usage report for at least two services, or at least two QCIs, associated with a single rating group. The method further comprises establishing an updated quota for the single rating group, wherein the wireless terminal is capable of receiving packet data within the updated quota for the at least two services or the at least two QCIs associated with the single rating group. The method further comprises sending, to the PGW, the updated quota.

Some of the example embodiments are directed towards an OCS for establishing a usage quota for wireless terminal service usage with respect to a rating group. The OCS is configured to operate in a communications network. The OCS comprises receiving circuitry configured to receive, from a PGW, a MSCC report. The MSCC report comprises a usage report for at least two services, or at least two QCIs, associated with a single rating group. The OCS further comprises processing circuitry configured to establish an updated quota for the single rating group, wherein the wireless terminal is capable of receiving packet data within the updated quota for the at least two services or the at least two QCIs associated with the single rating group. The receiving circuitry is further configured to send, to the PGW, the updated quota.

DEFINITIONS

3GPP Third Generation Partnership Project
AF Application Function
AVP Attribute Value Pair
BBERF Bearer Binding and Event Reporting Function
BSC Base Station Controller
CCA Credit Control Answer
CCR Credit Control Request
CDR Charging Data Record
E-UTRAN Evolved Universal Terrestrial Radio Access Network
eNB eNodeB
EPC Evolved Packet Core
GBR Guaranteed Bit Rate
GERAN GSM/EDGE Radio Access Network
GSM Global System for Mobile Communications
GSU Granted Service Unit
IP Internet Protocol
LTE Long Term Evolution
MBR Maximum Bit Rate
MSCC Multiple Services Credit Control
OCS Online Charging System
OFCS Offline Charging System
PCC Policy and Charging Control
PCEF Policy and Charging Enforcement Function
PCRF Policy Control and Charging Rules Function
PDN Packet Domain Network
PGW Packet Domain Network Gateway
QCI Quality of Service Class Identifier
QoS Quality of Service
RAN Radio Access Network
RBS Radio Base Station
RG Rating Group
RNC Radio Network Controller
RSU Requested Service Unit
SDF Service Data Flow
SI Service Identifier
SPR Subscription Profile Repository
TDF Traffic Detection Function
UE User Equipment
UMTS Universal Mobile Telecommunications System
USU Used Service Unit
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should also be appreciated that the term wireless terminal and user equipment may be used interchangeably.

Example embodiments presented herein are directed towards a system for service usage reporting and quota management in a Policy and Charging Control (PCC) based network. According to the example embodiments, the quota reporting and quota management is performed on a pre-rating group basis. Performing such tasks on a pre-rating group basis allows for a reduction in required message signalling and reduces the risk of quota fragmentation.

Figure 1:
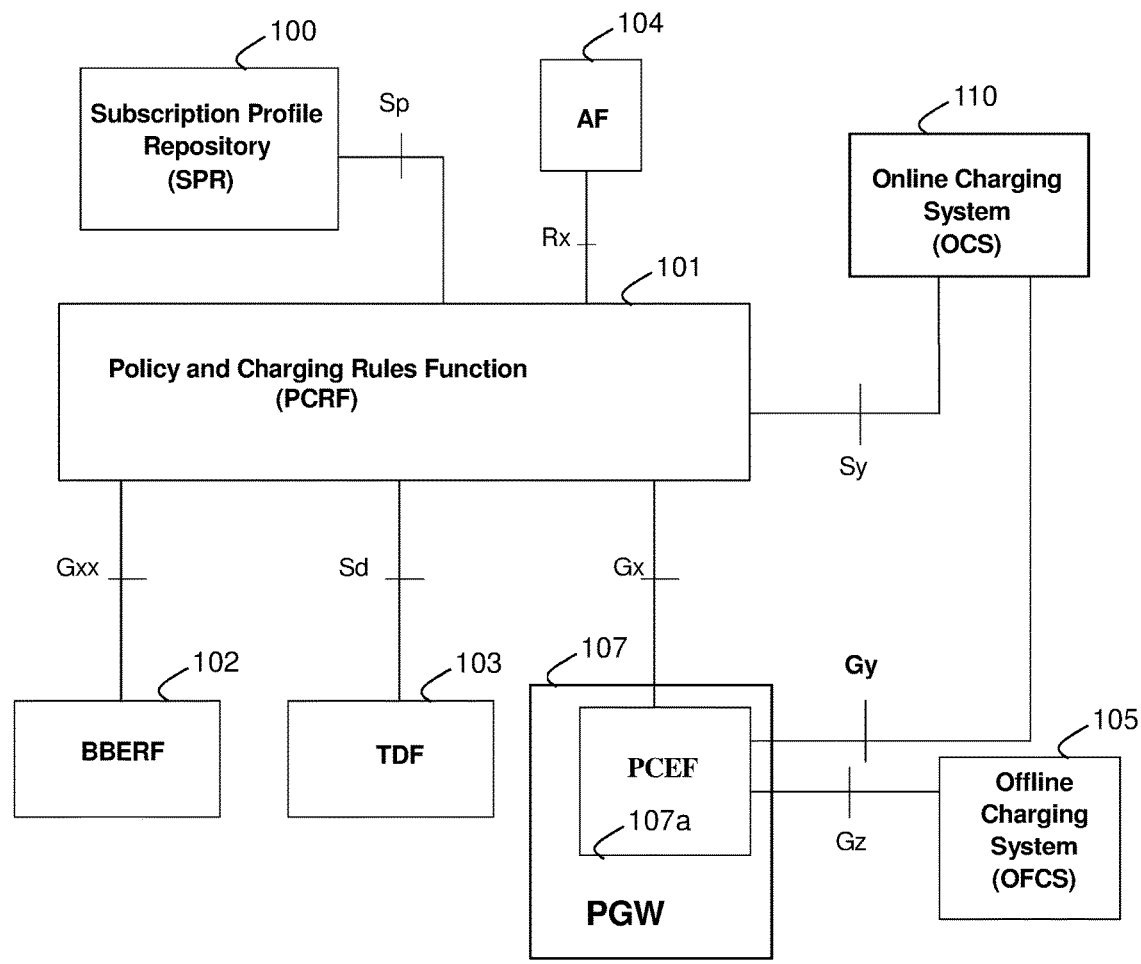
FIG. 1 is an illustrative example of PCC architecture.

In order to provide a better explanation of the example embodiments presented herein, a problem will first be identified and discussed. FIG. 1 is an illustrative example of nodes in a 3GPP PCC architecture which are configured to operate in a communications network. The PCC network comprises a Subscription Profile Repository (SPR) 100. The SPR 100 comprises subscriber/subscription information. This information is provided on a per-PDN basis and may comprise a subscriber's allowed services, information regarding a subscriber's allowed QoS (MBR and GBR), a subscriber's charging related information, and/or information regarding a subscriber category.

The PCC based network further comprises a PCRF 101. The PCRF 101 provides network control regarding service data flow detection, gating (blocking or allowing packets), QoS control and flow-based charging towards the PCEF 101. The Sp interface resides between the SPR 100 and the PCRF 101. It allows the PCRF 101 to request subscription information related to a subscriber's service/session. The PCC based network further comprises a Bearer Binding and Event Reporting Function (BBERF) 102. The BBERF 102 is used via the Gxx interface to test the capacity and performance of a PCRF 101.

The PCC based network further comprises a Traffic Detection Function (TDF) 103 which allows for detection and control of applications. The PCC based network further comprises an Application Function (AF) 104 which is an element offering applications that require the control of Internet Protocol (IP) bearer resources, such as dynamic policy or charging control.

The PCC based network also comprises a Packet Data Network Gateway (PGW) 107 featuring a Policy and Charging Enforcement Function (PCEF) 107a. The PGW 107 is a gateway which terminates the interface towards the Packet Data Network (PDN). The PCEF 107a encompasses Service Data Flow (SDF) detection, policy enforcement and flow-based charging functionalities.

The PCC based network further comprises an Online Charging system (OCS) 110. The OCS 110 a system allowing a communications service provider to charge their customers, in real time, based on service usage. The PCC based network also comprises an Offline Charing system (OFCS) 105. The OFCS 105 receives events from the PCEF 400a and generates charging data records (CDRs) for the billing system.

Figure 2:
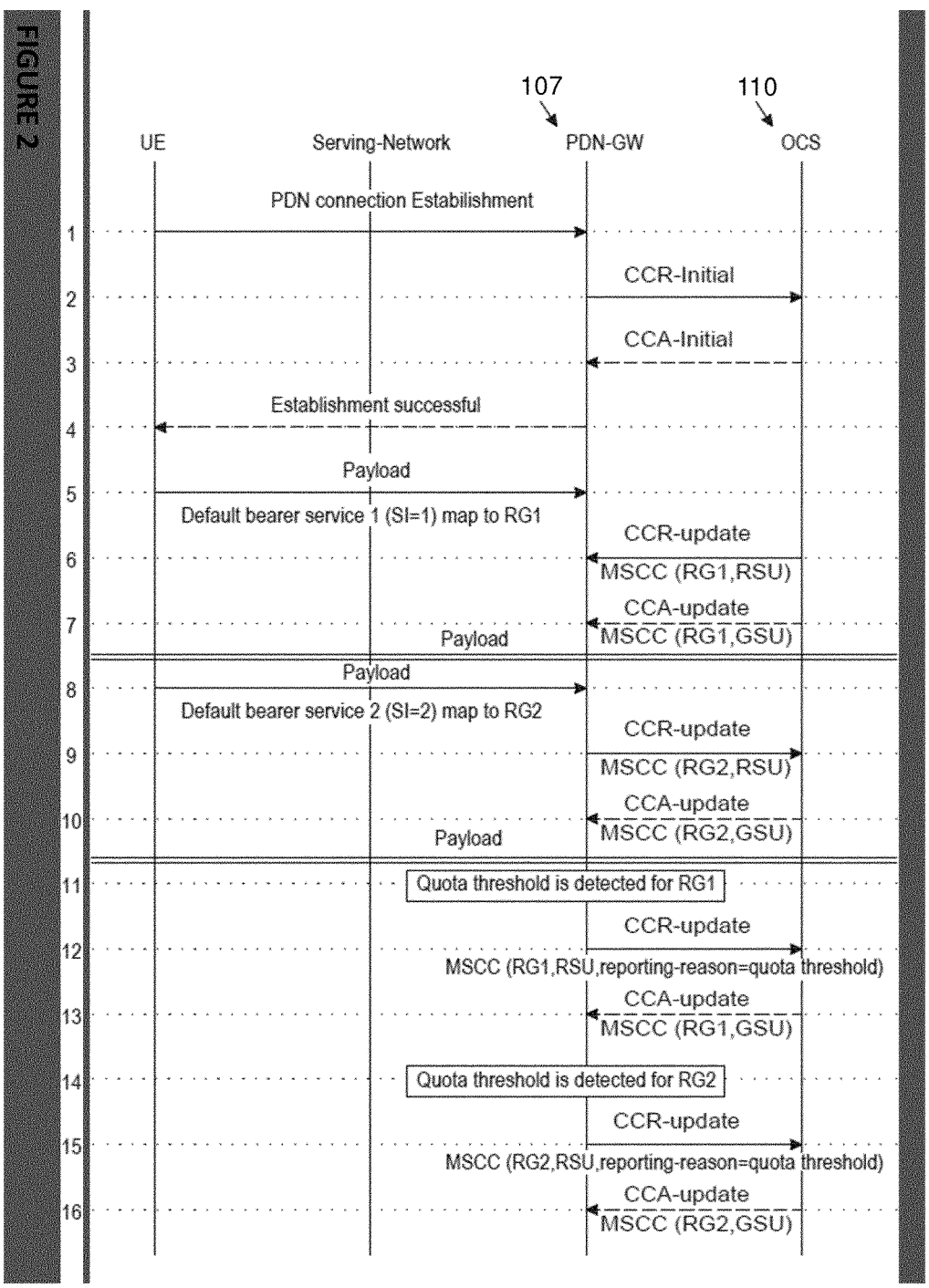
FIG. 2 is a messaging diagram depicting service usage reporting and quota management.

FIG. 2 is an illustrative example of service reporting and usage quota establishment. First, a wireless terminal (user equipment), establishes a PDN connection with a PGW (message 1). Thereafter, the PGW sends a Credit Control Request (CCR) to the OCS (message 2). The CCR is used to request an initial usage for each individual service. Upon receiving the CCR, the OCS defines different rating groups based on the different services the wireless terminal is configured to use. The OCS sends a Credit Control Answer (CCA) with the established rating group information for the respective services (message 3). The CCA also comprises an initial usage quote for the service identified in the CCR. Thereafter, the PGW will send an indication to the wireless terminal that the PDN establishment is successful (message 4).

Once the PDN connection is established, the wireless terminal will receive and send payload data related to the various services via the PGW (message 5). The PGW will monitor which rating group, or service, the payload data is associated with. Through this monitoring, the PGW will detect if a current service usage is approaching the usage quota. If the current service usage is approaching the usage quota, the PGW will send a CCR-update request to the OCS (message 6). The CCR-update request comprises a Multiple Services Credit Control (MSCC) report. The MSCC report provides a usage report for a single rating group (RG1) associated with a single service (SI1). The MSCC report further provides a Request for Service Units (RSU) for a higher quota. The OCS will thereafter determine the updated quota associated with RG1 and SI1 and send the PGW the updated quota or Granted Service Unit (GSU) via a MSCC response (message 7).

The wireless terminal will continue to receive and send payload data via the PGW (message 8). The PGW will continue to monitor usage for each individual service associated with its respective rating group. Once the PGW detects that the current service usage of another service is approaching its respective usage quota, the PGW will send a CCR-update request to the OCS (message 9). The OCS will send an updated quota in a similar manner as discussed for service one in messages 6 and 7 (message 10).

It should be appreciated that separate messages must be sent for the quota management of each individual service. Furthermore, all future quota management signalling is provided separately for each individual service, as illustrated in messages 12 and 13 with respect to service 1 and messages 15 and 16 with respect to message 2.

The system described in FIG. 1 forces an operator to define many different rating groups in an OCS to be able to handle quota-handling and usage reporting over Gy. Such a system increases the possibility of 'quota-fragmentation', for example, in the case where the same rating group is used by different services. If the same rating group is used by different services, the OCS cannot allocate a common quota to all the services that are mapped to this rating group. Instead, the OCS must divide or fragment the quota further so that it may be shared between different services. With respect to service detection, a quota request shall be sent to OCS for each service separately since they are mapped to different rating groups.

A need exists to provide quota management and service usage messaging in an efficient manner. Accordingly, some of the example embodiments presented herein provide a single rating group utilized for any number of services or QCIs. According to some of the example embodiments, one rating group may be comprised in several MSCCs inside a CCR message, where one of the MSCCs is conducting quota-handling (e.g., comprising an indication of the rating group and a RSU), while the other MSCC(s) (e.g., comprising an indication of the rating group and a Service Identifier as a key, and a USU but no RSU) are used for transferring reported usage accumulated at a (e.g., rating group and Service Identifier) level.

According to some of the example embodiments, the PCEF, comprised in the PGW, may accumulate usage on a per-rating group (and associated service) basis while the quota is granted at a rating group level. If more services using the same rating group are detected later, the PGW does not have to send a separate request to OCS for quota allocation.

According to some of the example embodiments, the PGW shall perform quota management as specified in standard and supervise the condition change when usage needs to be reported. Once the credit control update trigger condition is met, the usage accumulated on a per-rating group (and associated service) basis shall be reported over Gy from the PGW to the OCS, using one usage reporting MSCC (rating group+Service Identifier) to comprise Used Service Unit (USU) but without a RSU in CCR-messages.

According to some of the example embodiments, MSCCs without RSUs are sent for reporting purposes; therefore no corresponding MSCC in the CCA is needed. The value in 'reporting-reason' AVP (both inside USU and inside MSCC) may be set to new value 'reporting' or using the existing value 'other quota type'.

According to some of the example embodiments, a separate MSCC may accompany these above MSCCs and comprise the Requested Service Unit (RSU) in it to request quota for the rating group. The OCS shall handle this MSCC as usual, for example, grant quota to this rating group.

Figure 3:
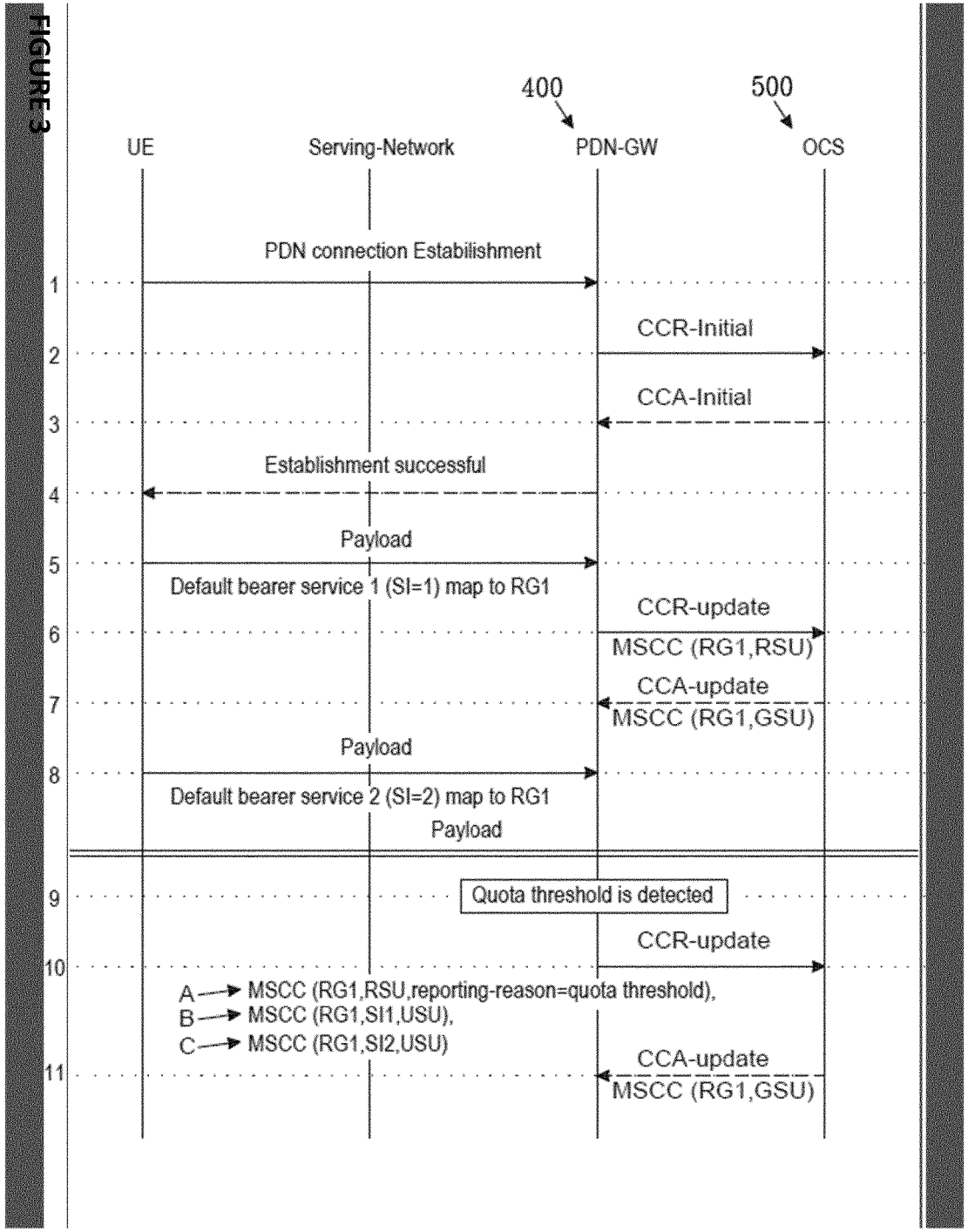
FIG. 3 is a messaging diagram depicting service usage reporting and quota management, according to some of the example embodiments.

FIG. 3 is an illustrative example of service reporting and usage quota establishment, according to some of the example embodiments. First, a wireless terminal (user equipment) establishes a PDN connection via a PGW (message 1). Thereafter, the PGW will send a Credit Control Request (CCR) to the OCS (message 2). The CCR is used to request an initial usage for a service or QCI. Upon receiving the CCR, the OCS will define a rating group based on the service or QCI the wireless terminal is configured to use. The OCS will send a Credit Control Answer (CCA) with the established rating group information for the service or QCI (message 3). The CCA will also comprise the initial usage quote for the established rating group. In contrast, the system of FIG. 2 establishes an initial usage quote on a per-service basis. Thereafter, the PGW will send an indication to the wireless terminal that the PDN establishment is successful (message 4).

Once the PDN connection is established, the wireless terminal will receive and send payload data related to the service or QCI via the PGW (message 5). The PGW will monitor which rating group, service, or QCI the payload data is associated with. Through this monitoring, the PGW will detect if a current service usage is approaching the usage quota of the associated rating group via, for example, a comparison to a threshold usage. If the current service usage is approaching the usage quota, the PGW will send a CCR-update request to the OCS (message 6). The CCR-update request comprises a Multiple Services Credit Control (MSCC) report. The MSCC report provides a usage report for a single rating group (RGI) associated with a single service (SII) or QCI. The MSCC report further provides a request for a higher quota (RSU). The OCS will thereafter determine the updated quota associated with RGI and SII and send the PGW the updated quota or Granted Service Unit (GSU) via a MSCC response (message 7).

Thereafter, the wireless terminal will send and receive payload data from another service (SI2) or QCI via the PGW (message 8). According to some of the example embodiments, the PGW will comprise a mapping or indication that the second service (SI2) or QCI is associated with the rating group that has already been established (RG1). Therefore, there is no need to send a separate quota request to the OCS as was performed in messages 9 and 10 of FIG. 2. No separate messaging is required since the allocated usage in FIG. 3 is provided on a per-rating group basis.

Once the PGW detects that a current combined usage of services 1 and 2 (SI1, SI2) has reached the established quota for the common rating group (RG1), the PGW will send the OCS a CCR-update message (message 10). According to some of the example embodiments, the CCR-update message may comprise any number of MSCC reports. In the example provided by FIG. 3, the MSCC report labelled A is utilized for quota handling. MSCC report A comprises the indication for the rating group (RG1) and a requested quota (RSU) as keys or message elements. MSCC report A also comprises an optional flag indicating the purpose of the MSCC report ('reporting-reason=quota threshold').

The MSCC reports labelled B and C are utilized for usage reporting. In the example provided by FIG. 3, MSCC report B comprises an indication of an associated rating group (RG1), the corresponding service (SI1) or QCI and the amount of quota usage (USU) for the corresponding service (SI1) or QCI. Similarly, MSCC report C comprises an indication of an associated rating group (RG1), the corresponding service (SI2) or QCI and the amount of quota usage (USU) for the corresponding service (SI2) or QCI.

According to some of the example embodiments, a separate MSCC report for the purpose of usage reporting is provided for each service or QCI utilizing a common rating group, with an additional MSCC report for the purpose of quota management being provided for requesting the actual quota with respect to a rating group. It should be appreciated that the embodiment illustrated in FIG. 3 is merely an example. According to some of the example embodiments, a single MSCC report for the purpose of usage reporting may be utilized for a plurality of services or QCIs.

According to some of the example embodiments, the OCS keeps internal records of the current usage and quota requests provided by the MSCC reports of message 10. The OCS will send a CCA-update message comprising a MSCC report indicating the granted quota (GSU) for the rating group (RG1) associated with the CCR-update (message 11). Thus, quota management is performed on a per-rating group basis. In contrast, the quota management of FIG. 2 was provided in a per-service basis.

Figure 4:
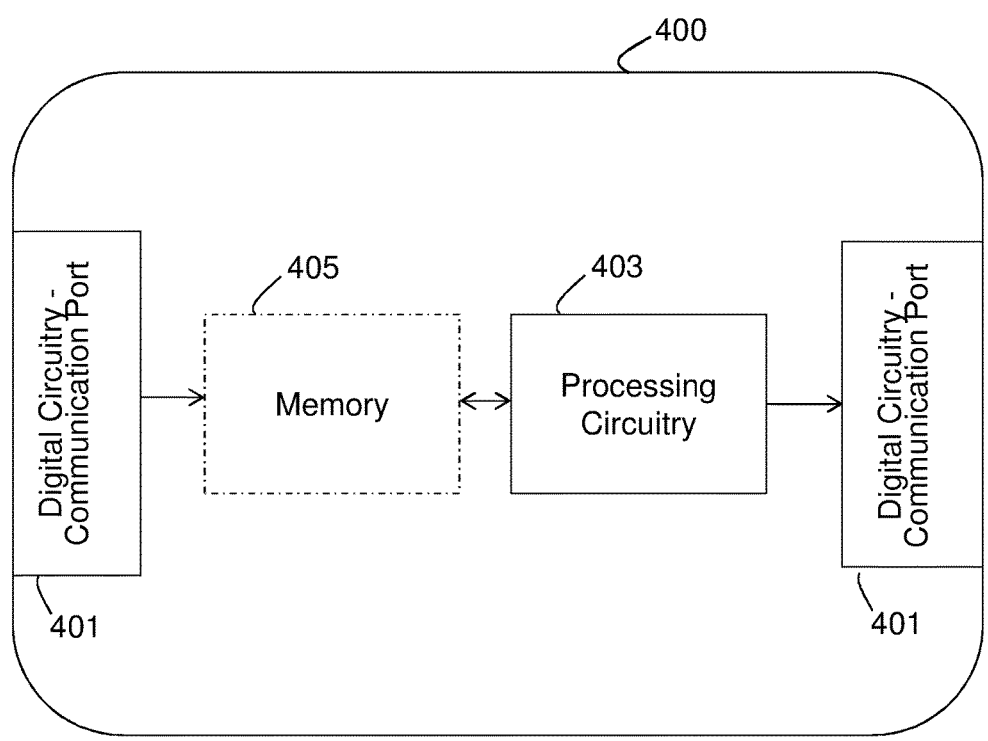
FIG. 4 is an example node configuration of a PGW, according to some of the example embodiments.

FIG. 4 illustrates an example node configuration of a PGW 400 which may perform some of the example embodiments described herein. The PGW 400 may comprise digital circuitry or a communication port 410 that may be configured to receive and/or transmit communication data, instructions, and/or messages. It should be appreciated that the digital circuitry or communication port 410 may be comprised as any number of transceiving, receiving, and/or transmitting units or circuitry. It should further be appreciated that the digital circuitry or communication port 410 may be in the form of any input or output communications port known in the art. The digital circuitry or communication port 410 may comprise RF circuitry and baseband processing circuitry (not shown).

The PGW 400 may also comprise a processing unit or circuitry 420 which may be configured to perform usage reporting or quota management as described herein. The processing circuitry 420 may be any suitable type of computation unit, for example, a microprocessor, digital signal processor (DSP), field programmable gate array (FPGA), or application specific integrated circuit (ASIC), or any other form of circuitry. The PGW 400 may further comprise a memory unit or circuitry 430 which may be any suitable type of computer readable memory and may be of volatile and/or non-volatile type. The memory 430 may be configured to store received, transmitted, and/or measured data, device parameters, and/or executable program instructions. The memory 430 may also be configured to store a mapping of services and QCIs with respect to associated rating groups.

Figure 5:
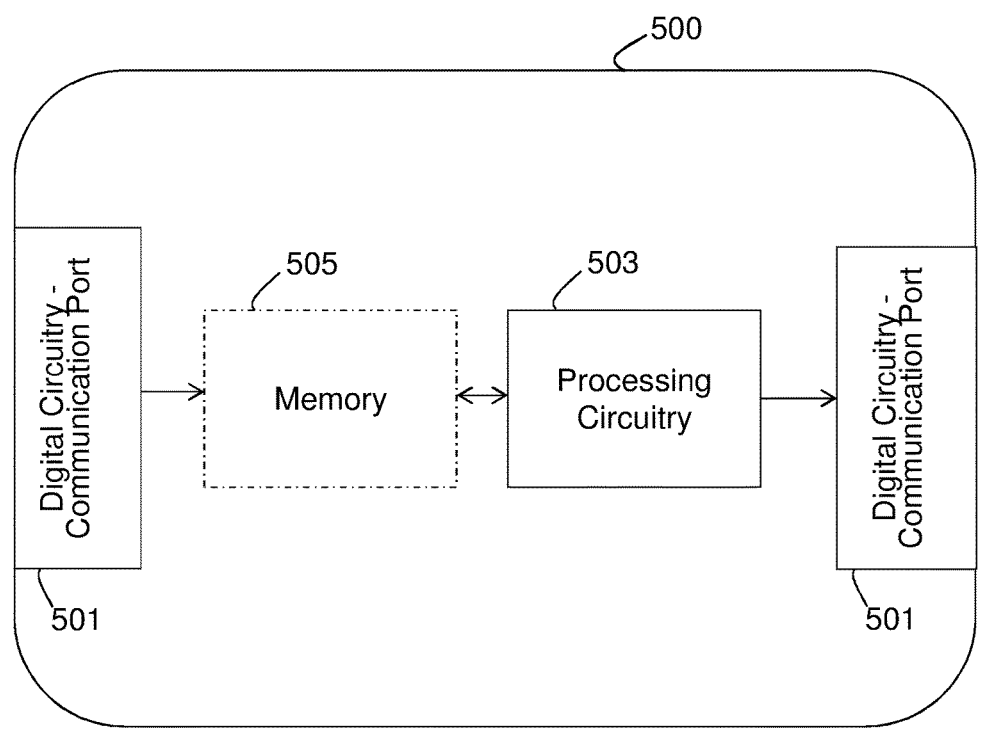
FIG. 5 is an example node configuration of an OCS, according to some of the example embodiments.

FIG. 5 illustrates an example node configuration of an OCS 500 which may perform some of the example embodiments described herein. The OCS 500 may comprise digital circuitry or a communication port 510 that may be configured to receive and/or transmit communication data, instructions, and/or messages. It should be appreciated that the digital circuitry or communication port 510 may be comprised as any number of transceiving, receiving, and/or transmitting units or circuitry. It should further be appreciated that the digital circuitry or communication port 510 may be in the form of any input or output communications port known in the art. The digital circuitry or communication port 510 may comprise RF circuitry and baseband processing circuitry (not shown).

The OCS 500 may also comprise a processing unit or circuitry 520 which may be configured to provide quota management and receive usage reports as described herein.

The processing circuitry 520 may be any suitable type of computation unit, for example, a microprocessor, digital signal processor (DSP), field programmable gate array (FPGA), or application specific integrated circuit (ASIC), or any other form of circuitry. The OCS 500 may further comprise a memory unit or circuitry 530 which may be any suitable type of computer readable memory and may be of volatile and/or non-volatile type. The memory 530 may be configured to store received, transmitted, and/or measured data, device parameters, and/or executable program instructions.

Figure 6:
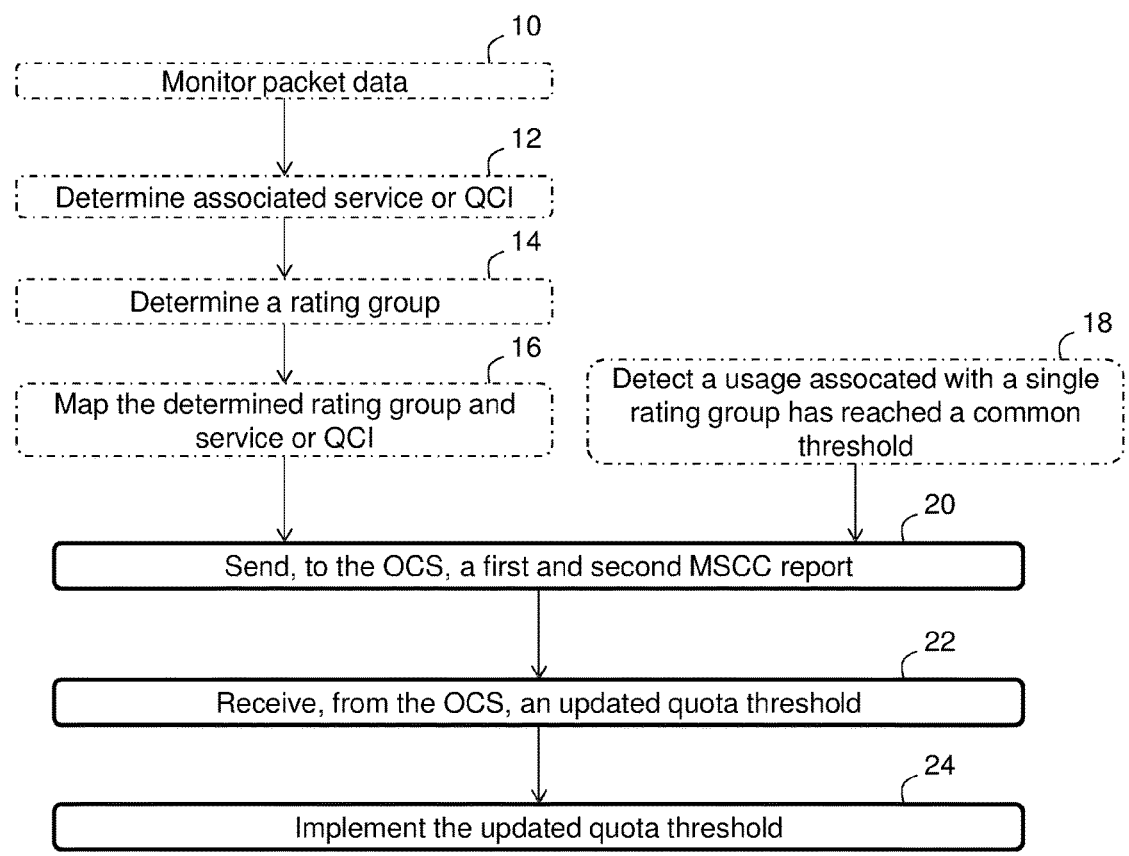
FIG. 6 is a flow diagram depicting example operations which may be taken by the PGW of FIGS. 2 and 4, according to some of the example embodiments.

FIG. 6 is a flow diagram depicting example operations which may be taken by the PGW 400 to quota reporting and quota management, as described herein. It should be appreciated that FIG. 6 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiments. It should be appreciated that these operations need not be performed in order. Furthermore, it should be appreciated that not all of the operations need to be performed. The example operations may be performed in any order and in any combination. It should be appreciated that communications between the PGW and OCS may be provided via a Gy interface.

Example Operation 10

According to some of the example embodiments, PGW 400 may be configured to monitor 10 packet data to and/or from a wireless terminal. The processing circuitry 403 is configured to monitor the packet data. As described in FIG. 3, the PGW 400 will monitor data receive by or transmitted from the wireless terminal (e.g., messages 5 and 8 of FIG. 3).

Example Operation 12

According to some of the example embodiments, the monitoring 10 may further comprise determining 12 a service, or QCI, associated with the packet data. The processing circuitry 403 is configured to determine the service or QCI associated with the packet data. As described in FIG. 3, the PGW 400 will determine what service or QCI is associated with data receive by or transmitted from the wireless terminal. For example, in FIG. 3, the PGW 400 will determine that the payload of message 5 is associated with service 1 (SI1) and the payload of message 8 is associated with service 2 (SI2).

Example Operation 14

According to some of the example embodiments, the monitoring 10 and the determining 12 further comprise determining 14 a rating group associated with the determined service or QCI. The processing circuitry 403 is configured to determine a rating group associated with the determined service or QCI.

For example, in FIG. 3, the determined service in message 5 is service 1 (SI1), therefore the associated rating group is determined to be rating group 1 (RG1). Similarly, the determined service in message 8 is service 2 (SI2), therefore the associated rating group is determined to be rating group 1 (RG1). It should be appreciated that the PGW 400 may determine the associated rating group via internal stored information or via information provided by the PCRF or OCS. It should also be appreciated that, according to some of the example embodiments, such information may be determined via information provided by any other node in the network.

Example Operation 16

According to some of the example embodiments, the monitoring 10, determining 12, and determining 14 may further comprising mapping 16 the determined service, or QCI, and rating group, wherein the rating group is previously mapped to at least one other service or QCI. The processing circuitry 403 is configured to determine the service, or QCI, and rating group, wherein the rating group is previously mapped to at least one other service or QCI. The mapping is provided so that the PGW 400 may provide if a current quota is approaching an allowed quota more easily.

Example Operation 18

According to some of the example embodiments, the PGW 400 is configured to detect 18 that a usage of any number of services, or QCIs, associated with a single rating group has reached a common threshold. The processing circuitry 403 is configured to detect that the usage of any number of services, or QCIs, associated with the single rating group has reached the common threshold.

Operation 20

The PGW 400 is configured to send 20, to the OCS, a first and second MSCC report. The first MSCC report comprises a usage report for at least two services, or at least two QCIs, associated with the single rating group. The second MSCC report comprises a quota request for the single rating group. The digital circuitry 401 is configured to send the first and second MSCC report. It should be appreciated that the sending may be performed after the detecting described in example operation 18.

As illustrated in FIG. 3, the CCR-update message may comprise a plurality of MSCC reports, each MSCC report may correspond to a usage report of a service associated with a same rating group (e.g., MSCC reports B and C). An additional MSCC reports may be provided to request an updated quota with respect to the same rating group (e.g., MSCC report A). It should be appreciated that this is merely an example and that the usage reporting MSCC reports (e.g., MSCC reports B and C) may be combined into a single MSCC report.

Operation 22

The PGW 400 is further configured to receive 22, from the OCS, an updated quota threshold. The updated quota threshold provides an indication of a maximum allowed usage for any number of services or QCIs associated with the single rating group. The digital circuitry 401 is configured to receive, from the OCS, the updated quota threshold.

In the example provided in FIG. 3, the updated quota threshold is provided in message 11. It should be appreciated that, according to the example embodiments, quota allocation, quota updates, and quota management in general, is provided on a pre-rating group basis. In contrast, the system of FIG. 2 provides quota management on a pre-service basis. Providing quota management on a pre-rating group basis greatly reduces the amount of message signalling required and further reduces the risk of quota fragmentation.

Operation 24

The PGW 400 is further configured to implement 24 the updated quota threshold. The processing circuitry 403 is configured to implement the updated quota threshold. Via the implementation of the updated quota threshold, the threshold from which the current service or QCI usage is monitored (e.g., as described in example operation 18) is adjusted or updated.

Figure 7:
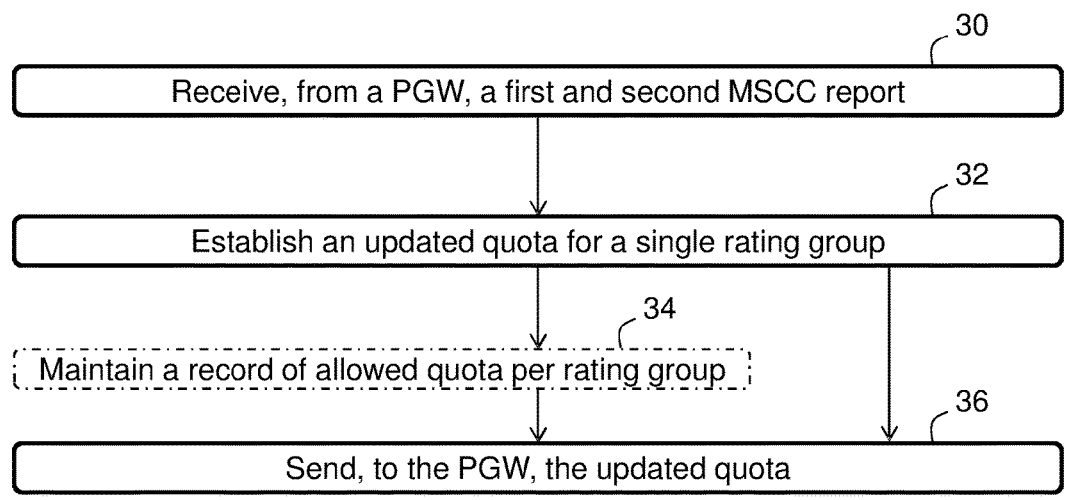
FIG. 7 is a flow diagram depicting example operations which may be taken by the OCS of FIGS. 2 and 5, according to some of the example embodiments.

FIG. 7 is a flow diagram depicting example operations which may be taken by the OCS 500 to receive quota usage reports and provided quota management, as described herein. It should be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiments. It should be appreciated that these operations need not be performed in order. Furthermore, it should be appreciated that not all of the operations need to be performed. The example operations may be performed in any order and in any combination. It should be appreciated that communications between the PGW and OCS may be provided via a Gy interface.

Operation 30

The OCS 500 is configured to receive 30, from a PGW 400, a first and second MSCC report. The first MSCC report comprises a usage report for at least two services, or at least two QCIs, associated with a single rating group. The second MSCC report comprises a quota request for the single rating group. The digital circuitry 501 is configured to receive, from the PGW 400, the first and second MSCC report.

As illustrated in FIG. 3, the CCR-update message may comprise a plurality of MSCC reports, each MSCC report may correspond to a usage report of a service associated with a same rating group (e.g., MSCC reports B and C). An additional MSCC reports may be provided to request an updated quota with respect to the same rating group (e.g., MSCC report A). It should be appreciated that this is merely an example and that the usage reporting MSCC reports (e.g., MSCC reports B and C) may be combined into a single MSCC report.

Operation 32

The OCS 500 is further configured to establish 32 an updated quota for the single rating group, where the wireless terminal is capable of receiving packet data within the updated quota the at least two services, or the at least two QCIs, associated with the single rating group. The processing circuitry 503 is configured to establish the updated quota for the single rating group, where the wireless terminal is capable of receiving packet data within the updated quota the at least two services, or the at least two QCIs, associated with the single rating group.

It should be appreciated that, according to the example embodiments, quota allocation, quota updates, and quota management in general, is provided on a pre-rating group basis. In contrast, the system of FIG. 2 provides quota management on a pre-service basis. Providing quota management on a pre-rating group basis greatly reduces the amount of message signalling required and further reduces the risk of quota fragmentation.

Example Operation 34

According to some of the example embodiments, the OCS 500 is further configured to maintain 34 a record of an allowed quota per rating group, where any number of services or QCIs is associated within the same rating group. The processing circuitry 503 is configured to maintain the record of the allowed quota per rating group, where any number of services or QCIs is associated within the same rating group.

Operation 36

The OCS 500 is further configured to send, to the PGW 400, the updated quota. The digital circuitry 501 is configured to send, to the PGW 400, the updated quota.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a Packet Data Network Gateway, PGW, for reporting service usage with respect to a single rating group, the PGW being configured to operate in a communications network, the method comprising:
   sending, to an Online Charging System, OCS, a first and second Multiple Services Credit Control, MSCC, report, said first MSCC report comprising a usage report for one of at least two services and at least two Quality of Service Class Identifiers, QCIs, associated with a single rating group, and said second MSCC report comprising a quota request for the single rating group;
   receiving, from the OCS, an updated quota threshold, said updated quota threshold providing an indication of a maximum allowed usage for any number of one of services and QCIs, associated with the single rating group;
   implementing said updated quota threshold;
   monitoring packet data at least one of to and from a wireless terminal;
   determining one of a service and a QCI associated with the packet data;
   determining a rating group associated with the determined one of the service and the QCI; and
   mapping the determined one of the service and the QCI, and rating group, wherein the rating group is previously mapped to at least one other of the at least one of a service and a QCI.

2. The method of claim 1, wherein the sending is performed upon detecting that a usage of any number of one of services and QCIs, associated with the single rating group has reached a common threshold.

3. The method of claim 2, wherein the sending is performed over a Gy interface.

4. The method of claim 1, wherein the sending is performed over a Gy interface.

5. A Packet Data Network Gateway, PGW, for reporting service usage with respect to a rating group, the PGW being configured to operate in a communications network, the PGW comprising:
   digital circuitry configured to send, to an Online Charging System, OCS, a first and second Multiple Services Credit Control, MSCC, report, said first MSCC report comprising one of a usage report for at least two services and at least two Quality of Service Class Identifiers, QCIs, associated with a single rating group, and said second MSCC report comprising a quota request for the single rating group;
   the digital circuitry further configured to receive, from the OCS, an updated quota threshold, said updated quota threshold providing an indication of a maximum allowed usage for any number of one of services and QCIs, associated with the single rating group; and
   processing circuitry configured to:
      implement said updated quota threshold;
      monitor packet data at least one of to and from a wireless terminal, the processing circuitry is further configured to:
      determine one of a service and a QCI associated with the packet data;
      determine a rating group associated with the determined one of the service and the QCI; and
      map the determined one of the service and the QCI, and rating group, wherein the rating group is previously mapped to at least one other of the at least one of a service and a QCI.

6. The PGW of claim 5, the processing circuitry further configured to determine that a usage of any number of one of services and QCIs, associated with the single rating group has reached a common threshold, wherein the digital circuitry is configured to send the first and second MSCC report upon the determination that the common threshold has been reached.

7. The PGW of claim 6, wherein the digital circuitry is configured to send the first and second MSCC report over a Gy interface.

8. The PGW of claim 5, wherein the digital circuitry is configured to send the first and second MSCC report over a Gy interface.

* * * * *